United States Patent
Maeda et al.

(10) Patent No.: US 10,147,943 B2
(45) Date of Patent: Dec. 4, 2018

(54) POSITIVE ELECTRODE ACTIVE MATERIAL FOR NONAQUEOUS ELECTROLYTE SECONDARY BATTERY, AND NONAQUEOUS ELECTROLYTE SECONDARY BATTERY

(71) Applicant: Panasonic Corporation, Osaka (JP)

(72) Inventors: Akihiro Maeda, Hyogo (JP); Hidekazu Hiratsuka, Osaka (JP)

(73) Assignee: Panasonic Corporation, Osaka (JP)

(*) Notice: Subject to any disclaimer, the term of this patent is extended or adjusted under 35 U.S.C. 154(b) by 0 days.

(21) Appl. No.: 14/962,986

(22) Filed: Dec. 8, 2015

(65) Prior Publication Data

US 2016/0248090 A1 Aug. 25, 2016

(30) Foreign Application Priority Data

Feb. 19, 2015 (JP) ................................. 2015-030872

(51) Int. Cl.
*H01M 4/525* (2010.01)
*H01M 10/052* (2010.01)
*H01M 4/02* (2006.01)

(52) U.S. Cl.
CPC .......... *H01M 4/525* (2013.01); *H01M 10/052* (2013.01); *H01M 2004/028* (2013.01)

(58) Field of Classification Search
None
See application file for complete search history.

(56) References Cited

U.S. PATENT DOCUMENTS

| | | | | |
|---|---|---|---|---|
| 2001/0036578 A1* | 11/2001 | Nishida | ................. | H01M 4/131 429/231.3 |
| 2002/0142222 A1 | 10/2002 | Nishida et al. | | |
| 2003/0129495 A1 | 7/2003 | Yamato et al. | | |
| 2005/0220700 A1 | 10/2005 | Suhara et al. | | |
| 2005/0271944 A1* | 12/2005 | Suhara | ................. | H01M 4/131 429/231.1 |
| 2009/0035659 A1 | 2/2009 | Takeuchi et al. | | |

(Continued)

FOREIGN PATENT DOCUMENTS

| | | |
|---|---|---|
| CN | 1315750 A | 10/2001 |
| CN | 1701451 A | 11/2005 |

(Continued)

OTHER PUBLICATIONS

Non-Final Office Action issued in U.S. Appl. No. 14/601,457, dated Mar. 3, 2016.

(Continued)

*Primary Examiner* — Wojciech Haske
(74) *Attorney, Agent, or Firm* — McDermott Will & Emery LLP

(57) ABSTRACT

A positive electrode active material for a nonaqueous electrolyte secondary battery contains, as a main component, a lithium composite oxide in which a ratio of Ni relative to a total number of moles of metal elements other than Li is greater than 30 mol %. The lithium composite oxide is a secondary particle being aggregation of primary particles having an average particle diameter of 3 μm or more and 20 μm or less, and having a compression rupture strength of 100 MPa or more and less than 200 MPa. The lithium composite oxide contains at least one element selected from Ba, Ca, and Sr.

5 Claims, 2 Drawing Sheets

(56) References Cited

U.S. PATENT DOCUMENTS

| | | |
|---|---|---|
| 2009/0057137 A1 | 3/2009 | Pitts et al. |
| 2009/0104530 A1 | 4/2009 | Shizuka et al. |
| 2010/0173202 A1 | 7/2010 | Saito et al. |
| 2010/0219370 A1 | 9/2010 | Nakamura et al. |
| 2010/0248040 A1 | 9/2010 | Saito et al. |
| 2010/0276217 A1 | 11/2010 | Sugaya et al. |
| 2011/0171529 A1 | 7/2011 | Kono et al. |
| 2011/0240913 A1 | 10/2011 | Kim et al. |
| 2012/0135319 A1 | 5/2012 | Saito et al. |
| 2012/0276446 A1 | 11/2012 | Kawai |
| 2013/0078520 A1 | 3/2013 | Toya et al. |
| 2013/0108920 A1 | 5/2013 | Oladeji |
| 2013/0146808 A1 | 6/2013 | Endo et al. |
| 2013/0164605 A1 | 6/2013 | Shimura et al. |
| 2013/0330609 A1 | 12/2013 | Sawa et al. |
| 2014/0079990 A1 | 3/2014 | Yanagida et al. |
| 2015/0221934 A1 | 8/2015 | Hiratsuka et al. |
| 2015/0243982 A1 | 8/2015 | Hiratsuka et al. |

FOREIGN PATENT DOCUMENTS

| | | |
|---|---|---|
| CN | 1706058 A | 12/2005 |
| JP | 10-308218 | 11/1998 |
| JP | 2004-220897 A | 8/2004 |
| JP | 2006-310181 | 11/2006 |
| JP | 2007-220650 A | 8/2007 |
| JP | 2007-257885 A | 10/2007 |
| JP | 2008-152923 A | 7/2008 |
| JP | 2009-032681 A | 2/2009 |
| JP | 2010-129509 A | 6/2010 |
| JP | 2012-238581 A | 12/2012 |
| WO | 2004/082046 A1 | 9/2004 |
| WO | 2009/139157 A1 | 11/2009 |
| WO | 2012/039413 A1 | 3/2012 |
| WO | 2012/165207 A1 | 12/2012 |
| WO | 2012/169083 A1 | 12/2012 |
| WO | 2014/103166 A1 | 7/2014 |

OTHER PUBLICATIONS

Final Office Action issued in U.S. Appl. No. 14/601,457, dated Aug. 26, 2016.
Non-Final Office Action issued in U.S. Appl. No. 14/962,986, dated Jan. 5, 2017.
Non-Final Office Action issued in U.S. Appl. No. 15/211,690, dated Dec. 29, 2016.
Specification and prosecution history of U.S. Appl. No. 15/211,690, filed Jul. 15, 2016.
Specification and prosecution history of U.S. Appl. No. 15/367,134, filed Dec. 1, 2016.
Specification and prosecution history of U.S. Appl. No. 14/424,326, filed Feb. 26, 2015.
Office Action dated Nov. 8, 2016, issued in counterpart Japanese Application No. 2014-554091. 3 pages.
Notification of Transmittal of Translation of the International Preliminary Report on Patentabililty (Form PCT/IB/338) issued in counterpart International Application No. PCT/JP2013/006977 dated Jul. 9, 2015 with Forms PCT/IB/326, PCT/IB/373 and PCT/ISA/237, with English translation. (10 pages).
International Search Report dated Jan. 21, 2014, issued in corresponding Application No. PCT/JP2013/006977; with English translation.
Final Office Action issued in U.S. Appl. No. 15/211,690, dated Jun. 15, 2017.
Non-Final Office Action issued in U.S. Appl. No. 15/600,188, dated Jun. 16, 2017.
English Translation of Chinese Search Report dated Dec. 28, 2017 for the related Chinese Patent Application No. 201510887730.2.
English Translation of Chinese Search Report dated Jul. 20, 2018 for the related Chinese Patent Application No. 201510887730.2.

* cited by examiner

US 10,147,943 B2

POSITIVE ELECTRODE ACTIVE MATERIAL FOR NONAQUEOUS ELECTROLYTE SECONDARY BATTERY, AND NONAQUEOUS ELECTROLYTE SECONDARY BATTERY

BACKGROUND

1. Technical Field

The present disclosure relates to a positive electrode active material for a nonaqueous electrolyte secondary battery, and to a nonaqueous electrolyte secondary battery.

2. Description of the Related Art

Japanese Unexamined Patent Application Publication No. 2006-310181 discloses a positive electrode active material formed of a lithium composite oxide doped with an alkaline earth metal (Mg, Ca, Sr, or Ba), with which crystal stability of the positive electrode active material during charging and properties such as cycle characteristics are improved. This patent document describes a method for synthesizing the positive electrode active material, the method including mixing raw materials including a compound of an alkaline earth metal to prepare a mixture, and firing the mixture.

Nonaqueous electrolyte secondary batteries desirably undergo less capacity degradation due to charge-discharge cycles, in other words, desirably have improved cycle characteristics. The positive electrode active material described in the patent document above still needs improvements in this respect.

SUMMARY

One non-limiting and exemplary embodiment provides a positive electrode active material for a nonaqueous electrolyte secondary battery, the positive electrode active material containing a lithium composite oxide as a main component, in which a ratio of Ni relative to a total number of moles of metal elements other than Li is greater than 30 mol %. The lithium composite oxide includes a secondary particle being aggregation of primary particles having an average particle diameter of 3 μm or more and 20 μm or less, and having a compression rupture strength of 100 MPa or more and less than 200 MPa. The lithium composite oxide contains at least one element selected from Ba, Ca, and Sr.

According to the positive electrode active material for a nonaqueous electrolyte secondary battery of this disclosure, the cycle characteristics of the nonaqueous electrolyte secondary battery can be improved.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
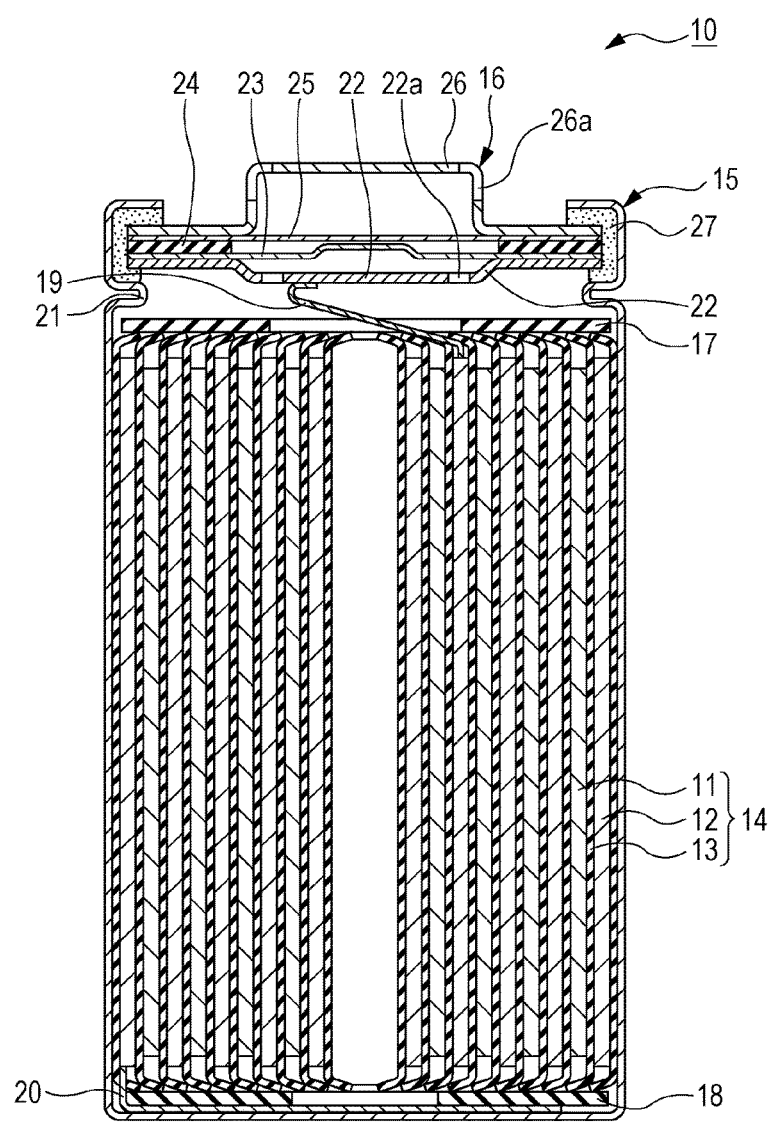
FIG. 1 is a cross-sectional view of a nonaqueous electrolyte secondary battery according to an exemplary embodiment.

As discussed above, improvements in cycle characteristics are desirable for nonaqueous electrolyte secondary batteries. The present inventors have contemplated that the major cause for capacity degradation is the increase in the number of isolated primary particles isolated from a conductive network inside active material particles resulting from cracking of positive electrode active material particles at boundaries between primary particles as the charge-discharge cycle is repeated. In this regard, the inventors have conducted extensive studies aiming to suppress capacity degradation due to charge-discharge cycles. As a result, the inventors have succeeded in synthesizing a positive electrode active material (secondary particles) of this disclosure having a large primary particle diameter and strong bonding strength between primary particles. This positive electrode active material is synthesized by preparing primary particles of a lithium-nickel composite oxide and adding at least one element selected from Ba, Ca, and Sr to the primary particles. According to this positive electrode active material, particle cracking caused by battery charge-discharge cycles occurs less frequently and even if particle cracking has occurred, there are fewer primary particles that are isolated from the conductive network. Thus, a nonaqueous electrolyte secondary battery of that uses the positive electrode active material of the present disclosure exhibits good cycle characteristics. In contrast, a positive electrode active material made up of small primary particles such as one described in Japanese Unexamined Patent Application Publication No. 2006-310181 will have a large number of primary particles isolated from the conductive network in the event of particle cracking caused by battery charge-discharge cycles, and there will be significantly large capacity degradation due to the charge-discharge cycles. Active material particles having high strength are not obtained by the method of firing a mixture to which an alkaline earth metal element is previously added, as with the synthetic method described in Japanese Unexamined Patent Application Publication No. 2006-310181.

An exemplary embodiment will now be described in detail.

The drawings referred in the Detailed Description are schematic and the structural components in the drawings may be depicted at dimensional ratios different from those of actual apparatuses. Specific dimensional ratios and other features are to be understood from the description provided below.

FIG. 1 is a cross-sectional view of a nonaqueous electrolyte secondary battery 10 according to an exemplary embodiment.

The nonaqueous electrolyte secondary battery 10 includes a positive electrode 11, a negative electrode 12, and a nonaqueous electrolyte. A separator 13 is desirably disposed between the positive electrode 11 and the negative electrode 12. The nonaqueous electrolyte secondary battery 10 is obtained by, for example, placing into a battery case a nonaqueous electrolyte and a wound electrode assembly 14 prepared by winding the positive electrode 11, the negative electrode 12, and the separator 13 placed between the electrodes. The wound electrode assembly 14 may be replaced with some other type of electrode assembly, such as a laminated electrode assembly obtained by alternately stacking a positive electrode and a negative electrode with a separator interposed therebetween. Examples of the battery case that accommodates the electrode assembly 14 and the nonaqueous electrolyte include cylindrical, prismatic, coinshaped, and button-shaped metal cases, and resin cases (laminate-type batteries) formed by laminating resin sheets. In the example shown in FIG. 1, the battery case is constituted by a case main body 15 having a bottom and a cylindrical shape, and a sealing member 16.

The nonaqueous electrolyte secondary battery 10 includes insulating plates 17 and 18 respectively disposed on the top and at the bottom of the electrode assembly 14. In the example shown in FIG. 1, a positive electrode lead 19 attached to the positive electrode 11 extends through a penetrating hole in the insulating plate 17 and toward the sealing member 16. A negative electrode lead 20 attached to the negative electrode 12 runs on the outer side of the insulating plate 18 and extends toward the bottom of the case main body 15. For example, the positive electrode lead 19 is connected to a lower surface of a filter 22 which serves as a bottom plate of the sealing member 16 by welding, for example, and a cap 26 serving as a top plate of the sealing member 16 electrically connected to the filter 22 functions as a positive electrode terminal. The negative electrode lead 20 is connected to an inner surface of the bottom of the case main body 15 by welding, for example, and the case main body 15 functions as a negative electrode terminal. In this embodiment, a current interrupt device (CID) and a gas discharge mechanism (safety valve) are formed in the sealing member 16. Another gas discharge valve is desirably formed in the bottom of the case main body 15.

The case main body 15 is, for example, a metal container having a bottom and a cylindrical shape. A gasket 27 is disposed between the case main body 15 and the sealing member 16 to keep the interior of the battery case airtight. The case main body 15 desirably has a projecting portion 21 that is formed by, for example, pressing a portion of a side surface from outside and that supports the sealing member 16. The projecting portion 21 desirably has a ring shape that extends in the circumferential direction of the case main body 15, and supports the sealing member 16 at its upper surface.

The sealing member 16 includes the filter 22 having a filter opening 22a, and a valve member disposed on the filter 22. The valve member covers the filter opening 22a of the filter 22 and breaks once the inner pressure of the battery is increased by heat generated by internal short-circuiting or other phenomenon. In this embodiment, the valve member includes a lower valve member 23 and an upper valve member 25, an insulating member 24 disposed between the lower valve member 23 and the upper valve member 25, and the cap 26 having a cap opening 26a. Each of the components that constitute the sealing member 16 has a disk shape or a ring shape, and the components other than the insulating member 24 are electrically connected to one another. Specifically, the filter 22 and the lower valve member 23 are connected to each other at the rim portions thereof, and the upper valve member 25 and the cap 26 are connected to each other at the rim portions thereof. The lower valve member 23 and the upper valve member 25 are connected to each other at the central portions thereof, and the insulating member 24 is interposed between the rim portions of these valve members. When the inner pressure is increased by the heat generated by internal short-circuiting or other phenomenon, for example, the lower valve member 23 breaks at its thin part, the upper valve member 25 thereby bulges toward the cap 26 and separates from the lower valve member 23, and electrical connection therebetween is interrupted.

Positive Electrode

The positive electrode is, for example, constituted by a positive electrode current collector formed of a metal foil or the like, and positive electrode active material layers formed on the positive electrode current collector. Examples of the positive electrode current collector include a foil of a metal, such as aluminum, that is stable within the potential range of the positive electrode, and a film coated with such a metal. The positive electrode active material layers desirably contain a conductive material and a binder in addition to the positive electrode active material. The positive electrode can be prepared by applying onto a positive electrode current collector a positive electrode mix slurry containing a positive electrode active material, a conductive material, a binder, and other suitable additives, drying the resulting coatings, and performing rolling so that positive electrode active material layers are formed on both sides of the current collector.

The conductive material is used to increase electrical conductivity of the positive electrode active material layers. Examples of the conductive material include carbon materials such as carbon black, acetylene black, Ketjen black, and graphite. These may be used alone or in combination.

The binder is used to maintain a satisfactory contact state between the positive electrode active material and the conductive material and strengthen the bond between the positive electrode active material and the surfaces of the positive electrode current collector, for example. Examples of the binder include fluorocarbon resins such as polytetrafluoroethylene (PTFE) and polyvinylidene fluoride (PVdF), polyacrylonitrile (PAN), polyimide resins, acrylic resins, and polyolefin resins. These resins may be used in combination with carboxymethyl cellulose (CMC) or a salt thereof (CMC-Na, CMC-K, CMC-NH$_4$, or the like which may be a partially neutralized salt), polyethylene oxide (PEO), or the like. These may be used alone or in combination.

Figure 2:
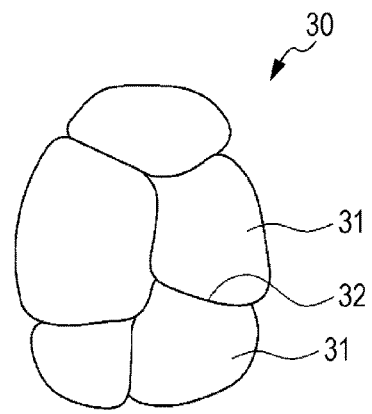
FIG. 2 is a schematic diagram of a positive electrode active material according to an exemplary embodiment.

FIG. 2 is a schematic view of a positive electrode active material 30 according to an exemplary embodiment. The positive electrode active material 30 contains, as a main component, a lithium composite oxide in which the ratio of nickel (Ni) relative to the total number of moles of metal elements other than Li is greater than 30 mol %. The main component is the component that has the largest content among the materials constituting the positive electrode active material 30. This lithium composite oxide is a secondary particle having a compression rupture strength of 100 MPa or more but less than 200 MPa and being formed by aggregation of primary particles 31 having an average particle diameter of 3 μm or more and 20 μm or less. The lithium composite oxide contains at least one element (herein after referred to as an "element α") selected from barium (Ba), calcium (Ca), and strontium (Sr). The element α is dissolved in a composite oxide A, for example. In the description below, the lithium composite oxide is referred to as a "composite oxide A".

The positive electrode active material 30 may contain components, such as a lithium composite oxide other than the composite oxide A, other than the composite oxide A, for example. The composite oxide A content relative to the total weight of the positive electrode active material 30 is desirably 50% by weight or more, more desirably 80% by weight or more, and most desirably 100% by weight. In this embodiment, the positive electrode active material 30 is solely composed of the composite oxide A (this means that the composite oxide A and the positive electrode active material 30 have the same meaning). Fine particles of an inorganic compound, for example, an oxide such as aluminum oxide ($Al_2O_3$) or a lanthanoid-element-containing compound, may be present on the particle surfaces of the positive electrode active material 30 (composite oxide A).

The element α contained in the composite oxide A increases the bonding strength between the primary particles 31. The total element α content of the composite oxide A is desirably 0.1 to 1 mol %, more desirably 0.2 to 0.8 mol %, and most desirably 0.3 to 0.7 mol % relative to the total number of moles of metal elements contained in the composite oxide A other than Li. As long as the total element α content is within this range, good cycle characteristics are obtained. The element α content of the composite oxide A can be measured by inductively coupled plasma (ICP) emission spectroscopy or X-ray photoelectron spectroscopy (XPS). The element α may be one element or a combination of two or more elements. Barium (Ba) is particularly desirable as the element α.

The composite oxide A is desirably a composite oxide represented by general formula $Li_xNi_yM^*_zM_{(1-y-z)}O_2$ (where $0.1 \leq x \leq 1.2$, $0.3 < y < 1$, $0.1 < z < 1$, M* represents at least one element α, and M represents at least one metal element other than the element α). The Ni content y is desirably greater than 0.3 in order to cut cost and increase the capacity, for example. The composite oxide A has a layered rocksalt-type crystal structure. The majority of the element α exists on the particle surfaces of the composite oxide A, for example, and some of the element α are diffused inside the particles.

Examples of the metal element M contained in the composite oxide A include Co, Mn, Mg, Zr, Al, Cr, V, Ce, Ti, Fe, K, Ga, and In. Among these, at least one selected from cobalt (Co), manganese (Mn), and aluminum (Al) is desirably contained. In order to cut cost and improve safety, for example, at least Mn is desirably contained. A desirable example of the composite oxide A is $LiNi_{0.30}Mn_{0.30}Co_{0.30}Ba_{0.1}O_2$. The composite oxide A may be one composite oxide or two or more composite oxides used in combination.

The composite oxide A can be synthesized from a lithium material as with typical lithium-transition metal composite oxides ($LiCoO_2$, $LiNi_{0.33}Mn_{0.33}Co_{0.33}O_2$, etc.) that are commonly used. However, in order to obtain a stable layered rocksalt phase by a typical method, excess Li is needed and the firing temperature needs to be in the range of 700° C. to 900° C. If the firing temperature is lower than 700° C., insufficient crystal growth results. If the firing temperature is higher than 900° C., Ni ions enter Li sites and site exchange (cation mixing) between Ni ions and Li ions occurs. As a result, the crystal structure may deform and battery characteristics may be degraded. Synthesis of the composite oxide A while controlling the firing temperature as such is difficult compared to synthesis of typical lithium-transition metal composite oxides from a lithium raw material.

A desirable example of a method for synthesizing the composite oxide A is a method that involves exchanging Na ions of a sodium-nickel composite oxide, which has been synthesized by firing a mixture of a sodium raw material and a nickel raw material, with Li ions. The composite oxide obtained by ion exchange is mixed with the element α and the resulting mixture is re-fired.

According to this method as compared with the method for synthesizing a lithium-nickel composite oxide from a lithium raw material, a layered rocksalt phase can be obtained even when the firing temperature and the Na content of the sodium-nickel composite oxide are varied significantly, and physical properties and crystal size of the synthesized product can be controlled. In general, a composite oxide containing Ni is likely to have a small primary particle diameter and form particles with large surface roughness; however, if this method is employed, deformation and collapse of the crystal structure do not occur during firing and crystal growth proceeds smoothly. Thus, the particle profile can be controlled.

The method for synthesizing a sodium-nickel composite oxide is as follows.

At least one material selected from metallic sodium and a sodium compound is used as the sodium raw material. The sodium compound may be any compound containing Na. Desirable examples of the sodium raw material include oxides such as $Na_2O$ and $Na_2O_2$, salts such as $Na_2CO_3$ and $NaNO_3$, and hydroxides such as NaOH. Among these, $NaNO_3$ is particularly desirable.

Any compound containing Ni can be used as a nickel raw material. Examples of the compound include oxides such as $Ni_3O_4$, $Ni_2O_3$, and $NiO_2$, salts such as $NiCO_3$ and $NiCl_2$, hydroxides such as $Ni(OH)_2$, and oxyhydroxides such as NiOOH. Among these, $NiO_2$ and $Ni(OH)_2$ are particularly desirable.

The mixing ratios of the sodium raw material and the nickel raw material are desirably adjusted in such a manner that a layered rocksalt-type crystal structure is generated. Specifically, the sodium content z in general formula $Na_zNiO_2$ is desirably 0.5 to 2, more desirably 0.8 to 1.5, and most desirably 1. For example, the sodium raw material and the nickel raw material are mixed to yield a chemical composition of $NaNiO_2$. The mixing method may be any method that can homogeneously mix these two materials. For example, the materials may be mixed by using a known mixing apparatus such as a mixer.

The mixture of the sodium raw material and the nickel raw material is fired in air or under oxygen stream. The firing temperature is desirably 600° C. to 1100° C. and more desirably 700° C. to 1000° C. The firing time is desirably 1 to 50 hours if the firing temperature is 600° C. to 1100° C. The firing time is desirably 1 to 10 hours if the firing temperature is 900° C. to 1000° C. The fired product is desirably pulverized by a known method. As a result, a sodium-nickel composite oxide is obtained.

The ion exchange method for the sodium-nickel composite oxide is as follows.

A desirable example of a method for ion-exchanging Na by Li is a method that involves adding a molten salt bed of a lithium salt to a sodium-transition metal composite oxide, and heating the resulting mixture. The lithium salt is desirably at least one selected from lithium nitrate, lithium sulfate, lithium chloride, lithium carbonate, lithium hydroxide, lithium iodide, and lithium bromide. The heating temperature during ion exchange treatment is desirably 200° C. to 400° C. and more desirably 330° C. to 380° C. The treatment time is desirably 2 to 20 hours and more desirably 5 to 15 hours.

Another suitable method for performing ion exchange treatment includes immersing a sodium-containing transition metal oxide into a solution containing at least one lithium salt. In such a case, a sodium-transition metal composite oxide is added to an organic solvent in which a lithium compound is dissolved, and is treated at a temperature equal to or lower than the boiling point of the organic solvent. The ion exchange treatment is desirably conducted by refluxing the solvent near the boiling point of the organic solvent in order to increase the ion exchange speed. The treatment temperature is desirably 100° C. to 200° and more desirably 140° C. to 180° C. The treatment time is desirably 5 to 50 hours and more desirably 10 to 20 hours although the treatment time differs depending on the treatment temperature.

A lithium-nickel composite oxide prepared through ion exchange described above may contain a certain amount of Na due to incomplete ion exchange. In such a case, the lithium-nickel composite oxide is expressed by, for example, general formula $Li_{xu}Na_{x(1-u)}Ni_yM^*_zM_{(1-y-z)}O_2$ (where $0.1 \leq x \leq 1.2$, $0.3 < y < 1$, $0.1 < z < 1$, $0.95 < u \leq 1$). In the formula, u represents a ratio of ion-exchanging Na by Li.

Next, the element α is added to the lithium-nickel composite oxide, and the resulting mixture is re-fired to obtain a composite oxide A containing the element α. The lithium-nickel composite oxide is a secondary particle constituted by aggregation of primary particles 31 having an average particle diameter of 3 µm or more and 20 µm or less. The physical properties, such as particle diameter, surface roughness, and density, of the composite oxide A are substantially determined prior to the step of adding the element α.

The element α added to and mixed with the lithium-nickel composite oxide may be metallic Ba, Ca, or Sr or a compound of Ba, Ca, or Sr. The compound may be any type of compound but is desirably an oxide. The element α is desirably added so that the total element α content is 0.1 to 1 mol % relative to the total number of moles of metal elements constituting the composite oxide A other than Li. The method for mixing the element α and the lithium-nickel composite oxide may be any method capable of mixing these homogeneously. For example, mixing may be conducted by using a known mixing machine such as a mixer.

Re-firing is conducted in air or under oxygen stream. The re-firing temperature needs to be lower than the temperature of the first firing, namely, the temperature at which a mixture of a sodium raw material and a nickel raw material is fired. A desirable re-firing temperature is 700° C. to 1050° C., and the desirable re-firing time is 1 to 50 hours. When the mixture is re-fired at a temperature 700° C. or higher but lower than the temperature of the first firing, for example, the element α can be diffused inside the particles without significantly changing the crystallite size and surface roughness. The re-fired product is desirably pulverized by a common method.

The composite oxide A (positive electrode active material 30) obtained by the above-described method is a secondary particles formed by aggregation of the primary particles 31 having an average particle diameter of 3 µm or more and 20 µm or less. Accordingly, particle boundaries 32 are present between the primary particles 31 in the composite oxide A. Although the composite oxide A (secondary particle) may aggregate with another composite oxide A (secondary particle), aggregated secondary particles can be separated from one another through ultrasonic dispersion. In contrast, a secondary particle cannot be separated into primary particles 31 through ultrasonic dispersion.

The volume-average particle diameter (Dv hereinafter) of the composite oxide A (secondary particle) is desirably 7 to 30 µm, more desirably 8 to 30 µm, and most desirably 9 to 25 µm. As long as Dv is within this range, for example, the surface roughness of the composite oxide A tends to be small and the packing density of the composite oxide A in the positive electrode is improved. Dv of the composite oxide A can be measured by a light diffraction scattering method. Dv is the particle diameter at a volume integrated value of 50% in a particle diameter distribution and is also referred to as a median diameter.

The average particle diameter of the primary particles 31 constituting the composite oxide A (hereinafter referred to as the "average primary particle diameter") is 3 µm or more and 20 µm or less and desirably 3 µm or more and 18 µm or less. When the average primary particle diameter is within this range, isolation of primary particles 31 from the conductive network can be suppressed even when active material particle cracking has occurred due to charging and discharging. A primary particle 31 is constituted by plural crystallites.

The average primary particle diameter can be measured with a scanning electron microscope (SEM).

The specific procedure is as follows:
(1) Select 10 particles at random from a particle image obtained by observing the composite oxide A with a SEM (×2000 magnification).
(2) Observe particle boundaries 32 etc., of the selected 10 particles and identify the primary particles 31 of each selected particle.
(3) Determine the largest diameter of the primary particles 31, and the average value of the diameters of the 10 selected particles is assumed to be the average primary particle diameter.

The size of the crystallites of the composite oxide A can be expressed as a crystallite size in a (003) vector direction which is a direction in which layers are stacked in a layered rocksalt-type crystal structure and as a crystallite size in a (110) vector direction which is a direction perpendicular to the (003) vector direction. In this specification, the crystallite size is determined as the crystallite size in the (110) vector direction. The average crystallite size of the composite oxide A in the (110) vector direction is desirably 100 nm or more and 300 nm or less, more desirably 110 nm or more and 250 nm or less, and most desirably 120 nm or more and 230 nm or less. As long as the average crystallite size is within this range, ion conductivity of the composite oxide A can be improved, for example.

The crystallite size is determined by obtaining a powder X-ray diffraction pattern of the composite oxide A by using a powder X-ray diffraction analyzer (trade name: D8ADVANCE produced by Bruker AXS K.K.) and analyzing the powder X-ray diffraction pattern through a whole powder pattern decomposition method (hereinafter referred to as "WPPD method").

The measurement conditions for the powder X-ray diffraction pattern are as follows:
X-ray output: 40 kV×40 mA
Detector: scintillation counter
Goniometer radius: 250 mm
Divergence slit: 0.6°
Scattering slit: 0.6°
Receiving slit: 0.1 mm
Soller slit: 2.5° (incident side, receiving side)

Measurement of the powder X-ray diffraction pattern is performed by a 2θ/θ method (measured at 2θ=15° to 140° with a step width of 0.01°) with a parallel specimen focusing geometry. The scanning time is set so that the intensity of the main peak ((111) plane) is about 10,000 counts.

The analytical procedure of the WPPD method is as follows.
Step 1: Start software (TOPAS) and load measurement data.
Step 2: Set Emission Profile (select Cu bulb, Bragg Brentano focusing geometry).
Step 3: Set Background (use Legendre polynominal as the profile function and set the number of terms to 8 to 20).
Step 4: Set Instrument (use Fundamental Parameter and input slit conditions, filament length, and sample length).
Step 5: Set Corrections (use Sample Displacement and also Absorption if sample packing density in sample holder is low, in which case Absorption is fixed to a line absorption coefficient of the measurement specimen).
Step 6: Set crystal structure (Select space group R3-*m*. Use lattice constant, crystallite size, and lattice strain. Set profile broadening due to crystallite size and lattice strain to Lorentzian).

Step 7: Execute calculation (refine background, sample displacement, diffraction intensity, lattice constant, crystallite size, and lattice strain and use Le Bail method for calculation).
Step 8: End analysis if the standard deviation of crystallite size is 6% or less of the refined value. Proceed to Step 9 if larger than 6%.
Step 9: Set profile broadening due to lattice strain to Gaussian (Keep Lorentzian for crystallite size).
Step 10: Execute calculation (refine background, sample displacement, diffraction intensity, lattice constant, crystalline size, and lattice strain).
Step 11: End analysis if the standard deviation of crystallite size is 6% or less of the refined value. Analysis is failed if larger than 6%.

As discussed above, the composite oxide A is formed by aggregation of large primary particles 31 having an average particle diameter of 3 μm or more, in which the bonding strength between the primary particles 31 is improved by addition of the element α. The compression rupture strength of the composite oxide A is 100 MPa or more but less than 200 MPa, desirably 120 MPa or more but less than 200 MPa, and most desirably 130 MPa or more but less than 200 MPa. When the compression rupture strength of the composite oxide A is within this range, particle cracking due to battery charge-discharge cycles occurs less frequently and good cycle characteristics can be obtained. Even if cracking of secondary particles occurs, there will be fewer primary particles 31 isolated from the conductive network since the particle diameter of the primary particles 31 is large.

The compression rupture strength of the primary particles 31 constituting the composite oxide A is desirably 400 MPa or more and 800 MPa or less. When the compression rupture strength of the primary particles 31 is within this range, pulverization of the primary particles 31 caused by battery charging and discharging is reduced, and good cycle characteristics are obtained. The compression rupture strength refers to the compression rupture strength of a single particle of the composite oxide A (hereinafter referred to as the "compression rupture strength (St)"). The compression rupture strength (St) is given by a mathematical formula, $St=2.8P/\pi d^2$ (P: load applied to the particle, d: particle diameter), described in Journal of MMIJ Vol. 81, No. 932, 1965 December, pp. 1024-1030. The particle diameter of the secondary particle is used as d in the formula, and the particle diameter of the secondary particle is used in calculating the compression rupture strength of the primary particles 31.

Figure 3:
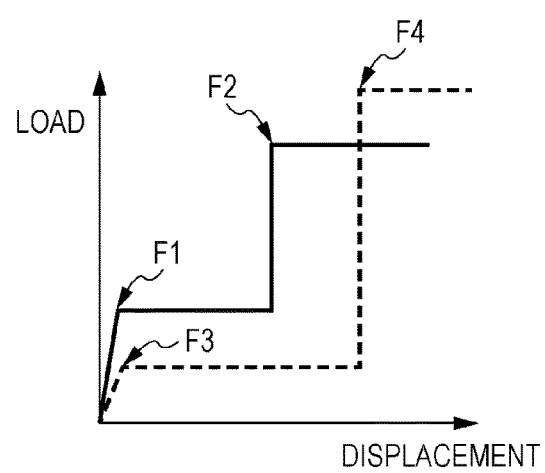
FIG. 3 is a graph showing a compression behavior of a positive electrode active material according to an exemplary embodiment.

FIG. 3 is a graph showing the relationship between the load applied to the composite oxide A and the displacement of the composite oxide A. When the composite oxide A is compressed by using a micro compression tester (the detail procedure is described below), a breaking point F1 at which the composite oxide A (secondary particle) breaks is observed. The load at the breaking point F1 is the load P in the above-described formula used in calculating the compression rupture strength (St). For example, both the displacement and the load increase linearly up to the breaking point F1, and after the breaking of the secondary particle at the breaking point F1, only the displacement increases while the load remains substantially the same. Then the load starts to increase again, and a breaking point F2 at which the primary particles 31 break is observed. The load at the breaking point F2 is used to calculate the compression rupture strength (St) of the primary particles 31.

FIG. 3 shows the compression behavior of a typical composite oxide having a large average primary particle diameter and containing no element α. This composite oxide has a small load at a breaking point F3 since the bonding strength between the primary particles is weak, in other words, the secondary particle has a low compression rupture strength. The load at the breaking point F4 is larger than the load at the breaking point F2 because the primary particle diameter is small and thus plural primary particles are compressed by the indenter.

The composite oxide A has smooth particle surfaces with small irregularities. The degree of smoothness (irregularities) of the particle surfaces can be evaluated through surface roughness measured by the procedure described below. The average surface roughness of the composite oxide A is desirably small. Specifically, the average surface roughness is desirably 4% or less and more desirably 3% or less. As long as the average surface roughness is 4% or less, output properties of the battery are improved, and the packing density of the composite oxide A in the positive electrode is improved. Desirably, 90% or more of the composite oxide A has a surface roughness of 4% or less and more desirably 95% or more of the composite oxide A has a surface roughness of 4% or less.

The average surface roughness of the composite oxide A is calculated by determining surface roughness of each particle. The surface roughness of 10 particles is measured, and the results are averaged to obtain an average surface roughness. The surface roughness (%) is calculated by using the following surface roughness calculation formula described in International Publication No. 2011/125577:

(Surface roughness)=(largest amount of change in particle radius r per degree)/(largest diameter of particle)

The particle radius r is the distance between a center C of a particle to a point on the perimeter of the particle, where the center C is defined as a point that bisects the largest diameter of the particle in profile analysis using a SEM image of the composite oxide A. The amount of change in particle radius r per degree is an absolute value. The maximum value is the largest change per degree observed by measuring the radius throughout the entire perimeter of the particle.

Negative Electrode

A negative electrode is constituted by a negative electrode current collector formed of, for example, a metal foil, and negative electrode mix layers formed on the current collector. Examples of the negative electrode current collector include a foil of a metal, such as copper, that is stable within the potential range of the negative electrode, and a film coated with such a metal. The negative electrode mix layers desirably contain a binder in addition to the negative electrode active material. The negative electrode can be prepared by, for example, applying a negative electrode mix slurry containing a negative electrode active material, a binder, and other suitable additives to a negative electrode current collector, drying the resulting coatings, and performing rolling so that negative electrode mix layers are formed on both sides of the current collector.

The negative electrode active material may be any material that can reversibly store and release lithium ions. Examples thereof include carbon materials such as natural graphite and artificial graphite, metals, such as silicon (Si) and tin (Sn), that alloy with lithium, and alloys and composite oxides containing metal elements such as Si and Sn. These negative electrode active materials can be used alone or in combination.

As in the case of the positive electrode, fluorocarbon resins, PAN, polyimide resins, acrylic resins, polyolefin resins, and the like can be used as the binder. In the case where a mix slurry is prepared by using an aqueous solvent, the binder is desirably CMC or a salt thereof (for example, CMC-Na, CMC-K, CMC-NH$_4$, or a partially neutralized salt thereof), styrene-butadiene rubber (SBR), polyacrylic acid (PAA) or a salt thereof (for example, PAA-Na, PAA-K, or a partially neutralized salt thereof), or a polyvinyl alcohol (PVA), for example.

Separator

A porous sheet having ion permeability and an insulating property is used as a separator. Specific examples of the porous sheet include a microporous thin membrane, woven cloth, and non-woven cloth. The material of the separator is desirably a polyolefin resin such as polyethylene or polypropylene, or a cellulose, for example. The separator may be a multilayer sheet constituted by a cellulose fiber layer and a thermoplastic resin fiber layer made of a polyolefin resin or the like. The separator may be a multilayer separator including a polyethylene layer and a polypropylene layer or a separator coated with an aramid resin or the like.

A filler layer containing an inorganic filler may be formed on at least one interface selected from a separator-positive electrode interface and a separator-negative electrode interface. An example of the inorganic filler is an oxide or phosphate compound that contains at least one selected from titanium (Ti), aluminum (Al), silicon (Si), and magnesium (Mg). The filler layer can be formed by, for example, applying a slurry containing the filler to surfaces of the positive electrode, the negative electrode, or the separator.

Nonaqueous Electrolyte

The nonaqueous electrolyte contains a nonaqueous solvent and an electrolyte salt dissolved in the nonaqueous solvent. The nonaqueous electrolyte is not limited to a liquid electrolyte (nonaqueous electrolyte solution) and may be a solid electrolyte that uses a gel polymer or the like. Examples of the nonaqueous solvent include esters, ethers, nitriles such as acetonitrile, amides such as dimethylformamide, and mixed solvents containing two or more selected from the foregoing. The nonaqueous solvent may contain a halogen-substituted product obtained by substituting at least some of hydrogen atoms in the solvent with halogen atoms such as fluorine atoms.

Examples of the esters include cyclic carbonate esters such as ethylene carbonate (EC), propylene carbonate (PC), and butylene carbonate, linear carbonate esters such as dimethyl carbonate (DMC), methyl ethyl carbonate (EMC), diethyl carbonate (DEC), methyl propyl carbonate, ethyl propyl carbonate, and methyl isopropyl carbonate, cyclic carboxylate esters such as γ-butyrolactone and γ-valerolactone, and linear carboxylate esters such as methyl acetate, ethyl acetate, propyl acetate, methyl propionate (MP), and ethyl propionate.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers; and linear ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxy toluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

Examples of the halogen-substituted product include fluorinated cyclic carbonate esters such as fluoroethylene carbonate (FEC), fluorinated linear carbonate esters, and fluorinated linear carboxylate esters such as methyl fluoropropionate (FMP).

The electrolyte salt is desirably a lithium salt. Examples of the lithium salt include LiBF$_4$, LiClO$_4$, LiPF$_6$, LiAsF$_6$, LiSbF$_6$, LiAlCl$_4$, LiSCN, LiCF$_3$SO$_3$, LiCF$_3$CO$_2$, Li(P(C$_2$O$_4$)F$_4$), LiPF$_{6-x}$(C$_n$F$_{2n+1}$)$_x$ (where 1<x<6, n=1 or 2), LiB$_{10}$Cl$_{10}$, LiCl, LiBr, LiI, chloroboranelithium, lithium lower aliphatic carboxylate, borates such as Li$_2$B$_4$O$_7$ and Li(B(C$_2$O$_4$)F$_2$), and imide salts such as LiN(SO$_2$CF$_3$)$_2$ and LiN(C$_l$F$_{2l+1}$SO$_2$)(C$_m$F$_{2m+1}$SO$_2$) (where l and m each represent an integer of 1 or more). Lithium salts may be used alone or in combination as a mixture. Among these lithium salts, LiPF$_6$ is desirably used from the viewpoints of ion conductivity and electrochemical stability, for example. The lithium salt concentration is desirably 0.8 to 1.8 mol per liter of the nonaqueous solvent.

EXAMPLES

The present disclosure will now be described in further detail through Examples below which do not limit the scope of the disclosure.

Example 1

Preparation of Positive Electrode Active Material

Sodium nitrate (NaNO$_3$), nickel(II) oxide (NiO), cobalt (II,III) oxide (Co$_3$O$_4$), and manganese(III) oxide (Mn$_2$O$_3$) were mixed to obtain Na$_{0.95}$Ni$_{0.33}$Co$_{0.33}$Mn$_{0.33}$O$_2$. The mixture was retained at a firing temperature of 950° C. for 35 hours to obtain a sodium-nickel composite oxide.

A molten salt bed prepared by mixing lithium nitrate (LiNO$_3$) and lithium hydroxide (LiOH) at a LiNO$_3$/LiOH molar ratio of 61:39 was added to the sodium-nickel composite oxide so that there were 5 eq (25 g) of the molten salt bed with respect to 5 g of the sodium-nickel composite oxide. The mixture was retained at a firing temperature of 200° C. for 10 hours to exchange the Na ions in the sodium-nickel composite oxide with Li ions. The substance after ion exchange was washed with water. A lithium-nickel composite oxide was obtained as a result.

To the resulting lithium-nickel composite oxide, barium oxide (BaO) was added, and the resulting mixture was re-fired to obtain a composite oxide A1. BaO was added so that the Ba content relative to the transition metal in the lithium-nickel composite oxide was 0.3 mol %. Then the mixture was re-fired by being retaining at 900° C. for 50 hours. The composite oxide A1 obtained by re-firing was classified, and those particles with Dv of 10.1 μm were used as a positive electrode active material A1. The average particle diameter of the primary particles constituting the positive electrode active material A1 was 3 μm.

The positive electrode active material A1 was analyzed by powder X-ray diffractometry with a powder X-ray diffraction analyzer (trade name: D8ADVANCE produced by Bruker AXS K.K., line source: Cu-Kα) to identify the crystal structure. The crystal structure obtained was assigned to a layered rocksalt-type crystal structure. The composition of the positive electrode active material A1 was analyzed with an ICP emission spectrometer (trade name: iCAP6300, produced by Thermo Fisher Scientific), and was found to be $Li_{1.1}Ni_{0.33}Co_{0.32}Mn_{0.32}Ba_{0.003}O_2$.

Preparation of Positive Electrode

A mixture of 95.8% by weight of the positive electrode active material A1, 3% by weight of carbon powder, and 1.2% by weight of polyvinylidene fluoride powder were mixed with an appropriate amount of N-methyl-2-pyrrolidone (NMP) to prepare a positive electrode mix slurry. The slurry was applied to both sides of an aluminum current collector having a width of 57.4 mm, a length of 566.5 mm, and a thickness of 15 μm by a doctor blade method, and the resulting coatings were dried and rolled by a rolling rollers so as to obtain a positive electrode constituted by a positive electrode current collector and positive electrode mix layers respectively disposed on both sides of the positive electrode current collector. A portion where no mix layer is formed is formed in a central portion of the current collector in the longitudinal direction and a positive electrode tab was attached to that portion.

Preparation of Negative Electrode

A mixture of 98.2% by weight of a negative electrode active material, 0.7% by weight of styrene-butadiene rubber, and 1.1% by weight of sodium carboxymethylcellulose was mixed with water to prepare slurry. A mixture of natural graphite, artificial graphite, and artificial graphite coated with amorphous carbon was used as the negative electrode active material. The slurry was applied to both sides of a copper current collector having a width of 59.2 mm, a length of 670 mm, and a thickness of 10 μm by a doctor blade method, and the resulting coatings were dried and rolled with rolling rollers to obtain a negative electrode constituted by a negative electrode current collector and negative electrode mix layers respectively disposed on both sides of the negative electrode current collector. A portion where no mix layer is formed is formed in each end portion of the current collector in the longitudinal direction and a negative electrode tab was attached to that portion.

Preparation of Nonaqueous Electrolyte

A nonaqueous electrolyte solution was obtained by dissolving 1.6 mol/L of $LiPF_6$ in an equivolume mixture nonaqueous solvent of ethylene carbonate (EC) and diethyl carbonate (DEC).

Preparation of Nonaqueous Electrolyte Secondary Battery

A nonaqueous electrolyte secondary battery B1 was prepared by using the positive electrode, the negative electrode, and the nonaqueous electrolyte solution described above, and a separator according to the following procedure.

(1) The positive electrode and the negative electrode separated from each other by the separator were wound to obtain a wound electrode assembly.

(2) An insulating plate was placed on the top of the wound electrode assembly and another at the bottom of the wound electrode assembly, and the wound electrode assembly was placed in a cylindrical battery outer casing can having a diameter of 18 mm and a height of 65 mm. The battery outer casing can was composed of steel and also served as a negative electrode terminal.

(3) A negative electrode current collecting tab was welded to the inner bottom portion of the battery outer casing can and a positive electrode current collecting tab was welded to a bottom plate of a sealing member having a safety valve and a current-interrupting mechanism. The sealing member functions as a positive electrode terminal.

(4) The nonaqueous electrolyte solution was supplied from an opening of the battery outer casing can, the battery outer casing can was sealed by using the sealing member, and a nonaqueous electrolyte secondary battery B1 was obtained as a result. The designed capacity of the nonaqueous electrolyte secondary battery B1 was 1900 mAh.

Example 2

A positive electrode active material A2 was prepared as in Example 1 except that the amount of BaO added was changed so that the Ba content was 0.7 mol %. A nonaqueous electrolyte secondary battery B2 was prepared as in Example 1 by using the positive electrode active material A2. The positive electrode active material A2 had Dv of 22.1 μm, and the average particle diameter of the primary particles constituting the positive electrode active material A2 was 16.5 μm.

Comparative Example 1

A positive electrode active material X1 was prepared as in Example 1 except that $WO_3$ was used instead of BaO and $WO_3$ was added so that the W content was 0.5 mol %. A nonaqueous electrolyte secondary battery Y1 was prepared as in Example 1 by using the positive electrode active material X1. The positive electrode active material X1 had Dv of 10 μm and the average particle diameter of the primary particles constituting the positive electrode active material X1 was 2 μm.

Comparative Example 2

A positive electrode active material X2 was prepared as in Example 1 except that BaO was not added. A nonaqueous electrolyte secondary battery Y2 was prepared as in Example 1 by using the positive electrode active material X2. The positive electrode active material X2 had Dv of 9.9 μm, and the average particle diameter of the primary particles constituting the positive electrode active material X2 was 0.5 μm.

Comparative Example 3

Powders of $NiSO_4$, NiO, $Co_3O_4$, and $MnSO_4$ were mixed so that $Ni_{0.31}Co_{0.31}Mn_{0.31}Ba_{0.07}(OH)_2$ was obtained, and to the mixture, an aqueous $Ba(OH)_2$ solution and an aqueous NaOH solution were added. The resulting hydroxide was fired at 700° C. for 10 hours to obtain a composite oxide. To the composite oxide, LiOH was added so that the ratio of the total number of moles of metal elements to Li was 1:1, and the resulting mixture was fired at 750° C. for 36 hours to obtain a lithium composite oxide. The lithium composite oxide was classified and those particles having Dv of 10.5 μm were used as the positive electrode active material X3 in preparing a nonaqueous electrolyte secondary battery Y3. The average particle diameter of the primary particles constituting the positive electrode active material X3 was 3 μm.

For each of the positive electrode active materials prepared in Examples and Comparative Examples, Dv, the average primary particle diameter, the average crystallite size, and the compression rupture strength were evaluated. The cycle characteristics (capacity retention ratio at the 500th cycle) of the nonaqueous electrolyte secondary batteries were also evaluated. The results are shown in Table.

Evaluation of Dv

Dv of the positive electrode active material (secondary particles) was determined with a laser diffraction scattering particle size distribution analyzer (trade name: LA-920 produced by Horiba Ltd.) by using a dispersion medium prepared by dispersing 1 mL of a surfactant (trade name:

Extran MA02, neutral, produced by MERCK) in 100 mL of ion exchange water. The measurement conditions were as follows: ultrasonic dispersion: 1 min, ultrasonic intensity: 1, circulation rate: 2, relative refractive index: 1.60 to 0.25.
Evaluation of Average Primary Particle Diameter From an image of a positive electrode active material obtained by observation with a SEM (×2000 magnification), 10 particles were selected at random. The particle boundaries of the selected 10 particles were observed and the primary particles were identified. The longest diameter of the primary particle was determined, and the average of the diameters of the 10 particles was assumed to be the average primary particle diameter.
Evaluation of Average Crystallite Size ditions and the capacity retention ratio at the 500th cycle was calculated from the formula below:

Capacity retention ratio=(discharge capacity at 500th cycle/discharge capacity at 1st cycle)×100

Charge/discharge conditions: Constant-current charging was performed at a current of 1.0 lt (1900 mA) until battery voltage was 4.35 V and then constant-voltage charging was performed at a voltage of 4.35 V until current value was 0.05 lt (95 mA). After 10 minutes of interval, constant-current discharging was performed at a current of 1.0 lt (1900 mA) until battery voltage was 3.0 V. The charge-discharge test was conducted at a temperature of 45° C.

TABLE

| | Element α | Amount added (mol %) | Adding method | Primary particle diameter (μm) | Crystallite size (nm) | Secondary particle diameter (μm) | Compression rupture strength (MPa) | Capacity retention ratio (%) |
|---|---|---|---|---|---|---|---|---|
| Example 1 | Ba | 0.3 | After | 3 | 135 | 10.1 | 198 | 83 |
| Example 2 | Ba | 0.7 | After | 16.5 | 225 | 22.1 | 140 | 84 |
| Comparative Example 1 | W | 0.5 | After | 2 | 140 | 10 | 250 | 80 |
| Comparative Example 2 | — | — | After | 0.5 | 160 | 9.9 | 100 | 75 |
| Comparative Example 3 | Ba | 0.7 | Before | 3 | 70 | 10.5 | 70 | 60 |

The crystallite size was determined by obtaining a powder X-ray diffraction pattern of the positive electrode active material by using a powder X-ray diffraction analyzer (trade name: D8ADVANCE produced by Bruker AXS K.K., line source: Cu-Kα) and analyzing the powder X-ray diffraction pattern through a whole powder pattern decomposition method (hereinafter referred to as "WPPD method"). The detailed analytical procedure was as described above.
Evaluation of Compression Rupture Strength Compression rupture strength was measured by using a micro compression tester (MCT-W201 produced by Shimadzu Corporation) under the following measurement conditions. Specifically, the deformation (displacement) of the particle under the load at the following loading rate and the load were measured on one sample particle. Then the load (N) at the breaking point F1 (refer to FIG. 3) and the particle diameter of the sample particle before deformation (particle diameter measured with a CCD camera) were substituted into the following equation to calculate the compression rupture strength of the secondary particle:
Equation for calculating compression rupture strength:

Compression rupture strength (MPa)=2.8×load(N)/
{π×(particle diameter (mm))$^2$}

Measurement Conditions for Compression Strength
  Testing temperature: normal (25° C.)
  Upper indenter: flat indenter (material: diamond) having a diameter of 50 μm
  Lower compression plate: SKS flat plate
  Measurement mode: compression test
  Test load: 10 mN minimum, 50 mN maximum
  Loading rate: 0.178 mN/sec minimum, 0.221 mN/sec maximum
  Displacement full scale: 10 μm
Evaluation of Cycle Characteristics (Capacity Retention Ratio at 500th Cycle)

Each nonaqueous electrolyte secondary battery was subjected to a charge-discharge test under the following con- Table shows the nonaqueous electrolyte secondary batteries B1 and B2 of Examples had high 500th cycle capacity retention ratio and good cycle characteristics compared to the nonaqueous electrolyte secondary batteries Y1 to Y3 of Comparative Examples. Particle cracking due to the battery charge-discharge cycles is less frequent and there would be fewer primary particles isolated from the conductive network in the event of particle cracking in positive electrode active materials A1 and A2 compared to, for example, the positive electrode active material X2. Accordingly, batteries that use the positive electrode active materials A1 and A2 have good cycle characteristics. In contrast, the positive electrode active material X1 has high secondary particle compression rupture strength but there would be more primary particles isolated from the conductive network in the event of particle cracking because the primary particle diameter is small. The positive electrode active material X3 obtained by firing a mixture to which Ba has been added in advance has low secondary particle strength and particle cracking may frequently occur due to charge-discharge cycles.

Although the experimental data that use Ba as the element α are described in Examples, the same effects can be expected when Ca and Sr are used as the element α.

What is claimed is:
1. A positive electrode active material for a nonaqueous electrolyte secondary battery, comprising:
  a lithium composite oxide as a main component, in which a ratio of Ni relative to a total number of moles of metal elements other than Li is greater than 30 mol %,
  wherein the lithium composite oxide includes a secondary particle being an aggregation of primary particles having an average particle diameter of 3 μm or more and 20 μm or less, and having a compression rupture strength of 100 MPa or more and less than 200 MPa, and the lithium composite oxide contains at least one element selected from Ba, Ca, and Sr, wherein the primary particles constituting the lithium composite oxide have a compression rupture strength of 400 MPa or more and 800 MPa or less and the lithium composite oxide has an average crystallite size of 120 nm or more and 300 nm or less in a (110) vector direction.

2. A nonaqueous electrolyte secondary battery comprising:
a positive electrode containing the positive electrode active material for a nonaqueous electrolyte secondary battery;
a negative electrode; and
a nonaqueous electrolyte,
wherein the positive electrode active material for a nonaqueous electrolyte secondary battery includes a lithium composite oxide as a main component, in which a ratio of Ni relative to a total number of moles of metal elements other than Li is greater than 30 mol %,
wherein the lithium composite oxide includes a secondary particle being an aggregation of primary particles having an average particle diameter of 3 μm or more and 20 μm or less, and having a compression rupture strength of 100 MPa or more and less than 200 MPa, and
the lithium composite oxide contains at least one element selected from Ba, Ca, and Sr, wherein the primary particles constituting the lithium composite oxide have a compression rupture strength of 400 MPa or more and 800 MPa or less and the lithium composite oxide has an average crystallite size of 120 nm or more and 300 nm or less in a (110) vector direction.

3. The positive electrode active material for a nonaqueous electrolyte secondary battery according to claim 1, wherein the lithium composite oxide includes a secondary particle being aggregation of primary particles having an average particle diameter of 3 μm or more and 18 μm or less.

4. The positive electrode active material for a nonaqueous electrolyte secondary battery according to claim 1, wherein the lithium composite oxide has an average crystallite size of 120 nm or more and 230 nm or less in a (110) vector direction.

5. The positive electrode active material for a nonaqueous electrolyte secondary battery according to claim 1, wherein the lithium composite oxide has an average surface roughness of 4% or less.

* * * * *